(12) United States Patent
Yomogisawa (10) Patent No.: US 8,605,326 B2
(45) Date of Patent: Dec. 10, 2013

(54) PRINT CONTROL APPARATUS, PRINTING APPARATUS, PRINT CONTROL METHOD AND COMPUTER READABLE MEDIUM STORING PROGRAM FOR CONTROLLING PARALLEL PRINT PROCESSING

(75) Inventor: Mitsuhisa Yomogisawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1003 days.

(21) Appl. No.: 12/204,279

(22) Filed: Sep. 4, 2008

(65) Prior Publication Data
US 2009/0244565 A1   Oct. 1, 2009

(30) Foreign Application Priority Data
Mar. 25, 2008   (JP) .................................. 2008-077844

(51) Int. Cl.
*G06F 15/00*   (2006.01)
(52) U.S. Cl.
USPC ........... 358/1.9; 358/2.1; 358/3.21; 358/3.22; 358/3.23; 358/3.24; 358/1.18; 358/501; 358/1.15; 358/518
(58) Field of Classification Search
None
See application file for complete search history.

(56) References Cited

U.S. PATENT DOCUMENTS

| | | | |
|---|---|---|---|
| 5,057,914 A * | 10/1991 | Tsuji et al. | 358/530 |
| 5,971,523 A * | 10/1999 | Werner | 347/43 |
| 6,798,544 B1 * | 9/2004 | Chiba et al. | 358/3.22 |
| 6,995,862 B1 * | 2/2006 | Murata et al. | 358/1.9 |
| 7,042,602 B1 * | 5/2006 | Yang et al. | 358/518 |
| 7,420,700 B2 * | 9/2008 | Hayashi | 358/1.15 |
| 2002/0186388 A1 * | 12/2002 | Tanioka et al. | 358/1.9 |
| 2004/0095596 A1 * | 5/2004 | Rijavec | 358/1.15 |
| 2004/0109202 A1 * | 6/2004 | Okuyama | 358/2.1 |
| 2004/0239996 A1 * | 12/2004 | Hayashi | 358/3.03 |
| 2006/0092439 A1 * | 5/2006 | Hirabayashi | 358/1.9 |
| 2006/0221371 A1 * | 10/2006 | Ogasawara | 358/1.13 |
| 2006/0268316 A1 * | 11/2006 | Condon et al. | 358/1.15 |
| 2006/0268340 A1 * | 11/2006 | Futami | 358/1.16 |
| 2008/0052301 A1 * | 2/2008 | Miyata | 707/100 |
| 2008/0080009 A1 * | 4/2008 | Masui et al. | 358/3.28 |

FOREIGN PATENT DOCUMENTS

JP   2001-162760 A   6/2001
JP   3488157 B2   10/2003

* cited by examiner

*Primary Examiner* — Hilina K Demeter
(74) *Attorney, Agent, or Firm* — Sughrue Mion, PLLC (57) ABSTRACT

A print control apparatus includes: plural drawing processing units capable of drawing processing on print information having plural print basic colors; an analysis unit that analyzes information contents of the print information; and a selection unit that selects whether the drawing processing on the print information is performed by the drawing processing units in parallel by a predetermined unit of information amount or in parallel by each of the plural print basic colors, based on a result of analysis by the analysis unit.

4 Claims, 14 Drawing Sheets

PAGE-BASED PARALLEL PROCESSING

COLOR-BASED PARALLEL PROCESSING

PRINT CONTROL APPARATUS, PRINTING APPARATUS, PRINT CONTROL METHOD AND COMPUTER READABLE MEDIUM STORING PROGRAM FOR CONTROLLING PARALLEL PRINT PROCESSING

CROSS-REFERENCE TO RELATED APPLICATIONS

This application is based on and claims priority under 35 USC 119 from Japanese Patent Application No. 2008-077844 filed Mar. 25, 2008.

BACKGROUND

Technical Field

The present invention relates to a print control apparatus, a printing apparatus, a print control method and a computer readable medium storing a program.

SUMMARY

According to an aspect of the invention, provided is a print control apparatus including: plural drawing processing units capable of drawing processing on print information having plural print basic colors; an analysis unit that analyzes information contents of the print information; and a selection unit that selects whether the drawing processing on the print information is performed by the drawing processing units in parallel by a predetermined unit of information amount or in parallel by each of the plural print basic colors, based on the result of analysis by the analysis unit.

BRIEF DESCRIPTION OF THE DRAWINGS

Exemplary embodiments of the present invention will be described in detail based on the following figures, wherein.

DETAILED DESCRIPTION

Next, exemplary embodiments of the present invention will be described based on the drawings.
[First Exemplary Embodiment]

Figure 1:
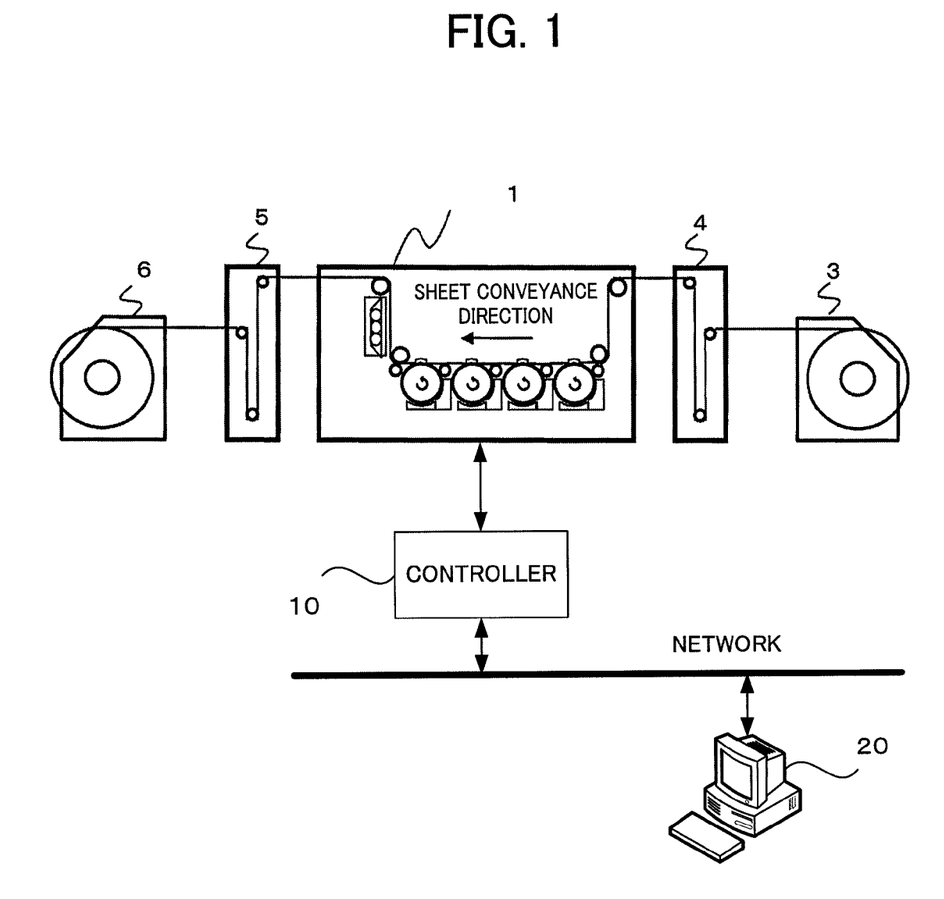
FIG. 1 illustrates an example of the configuration of a printing apparatus according to a first exemplary embodiment of the present invention.

FIG. 1 illustrates an example of the configuration of a printing apparatus according to a first exemplary embodiment of the present invention. As shown in FIG. 1, the printing apparatus has a pre-processing device 3, a buffer device 4, a printing device 1 which performs printing on continuous-form paper, a buffer device 5, a post-processing device 6, a controller 10 and a terminal device 20.

The pre-processing device 3 performs pre-processing such as feeding of unprinted print sheets. The post-processing device 6 performs post-processing such as take-up of print-completed print sheets. The buffer devices 4 and 5 are provided to hold tension of the print sheet between the pre-processing device 3 and the printing device 1 and between the printing device 1 and the post-processing device 6.

The terminal device 20 generates print data such as a print job and transmits the print data to the controller 10 via a network. The controller 10 functions as a print control apparatus to control a printing operation of the printing device 1 based on the print data transmitted from the terminal device 20. The printing device 1 outputs an image corresponding to the print data on the continuous-form paper based on the control of the controller 10.

Figure 2:
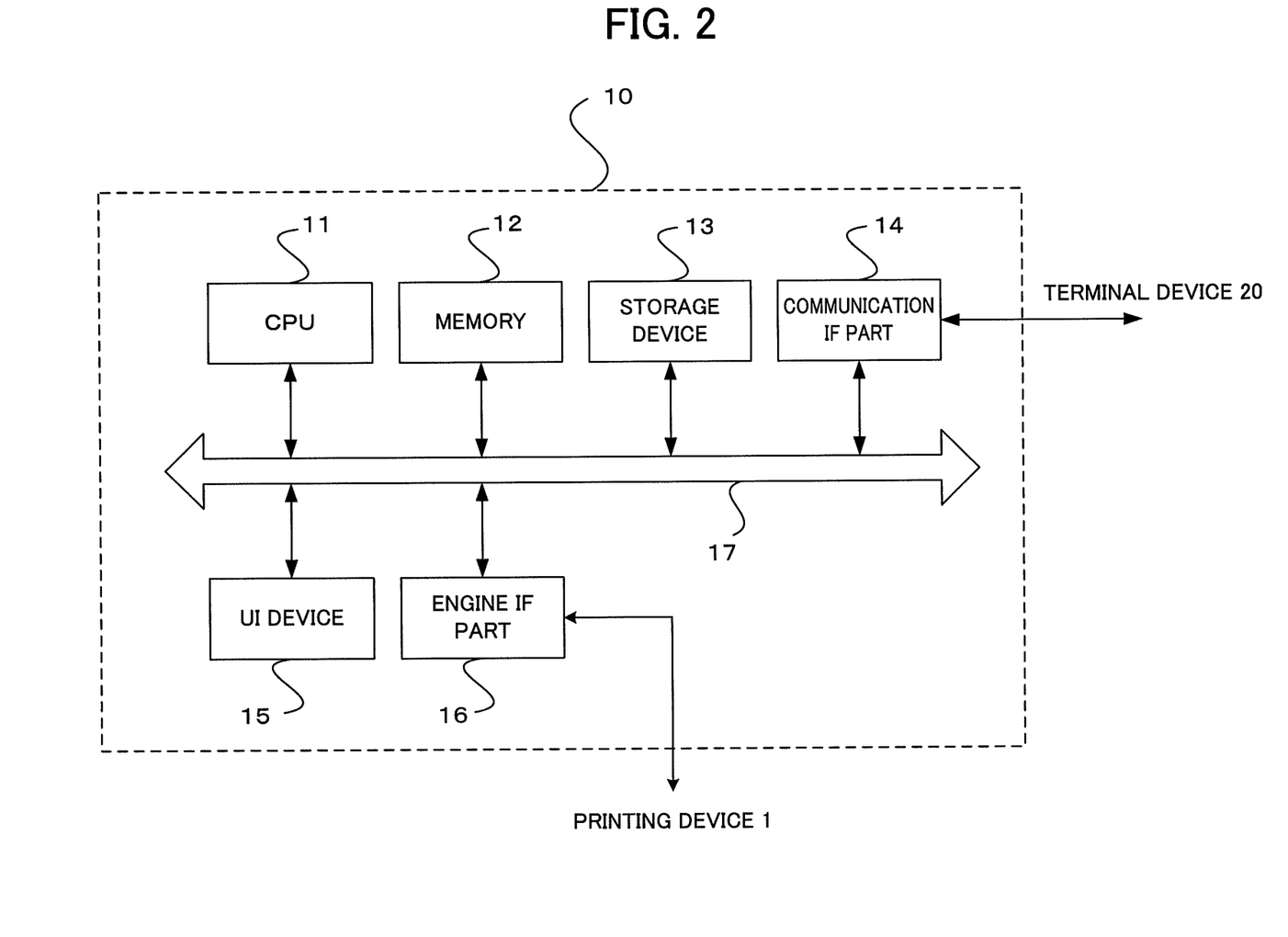
FIG. 2 is a block diagram showing the hardware configuration of the printing apparatus according to the first exemplary embodiment of the present invention.

Next, the hardware configuration of the controller 10 in the printing apparatus according to the present exemplary embodiment will be described with reference to FIG. 2. As shown in FIG. 2, the controller 10 according to the present exemplary embodiment has a CPU 11, a memory 12, a storage device 13 such as a hard disk drive (HDD), a communication interface (IF) part 24 which performs data transmission/reception to/from the terminal device 20 via the network, a user interface (UI) device 15 formed with a touch panel or a liquid crystal display, and an engine IF unit 16 which performs data transmission/reception to/from the printing device 1. These constituent elements are interconnected via a control bus 17.

The CPU 11 performs predetermined processing based on a print control program stored in the memory 12 or the storage device 13, to control the operation of the controller 10.

Note that in the present exemplary embodiment, the CPU 11 reads the control program stored in the memory 12 or the storage device 13 and executes the program; however, the program may be stored in a portable storage medium such as a CD-ROM and provided to the CPU 11.

Figure 3:
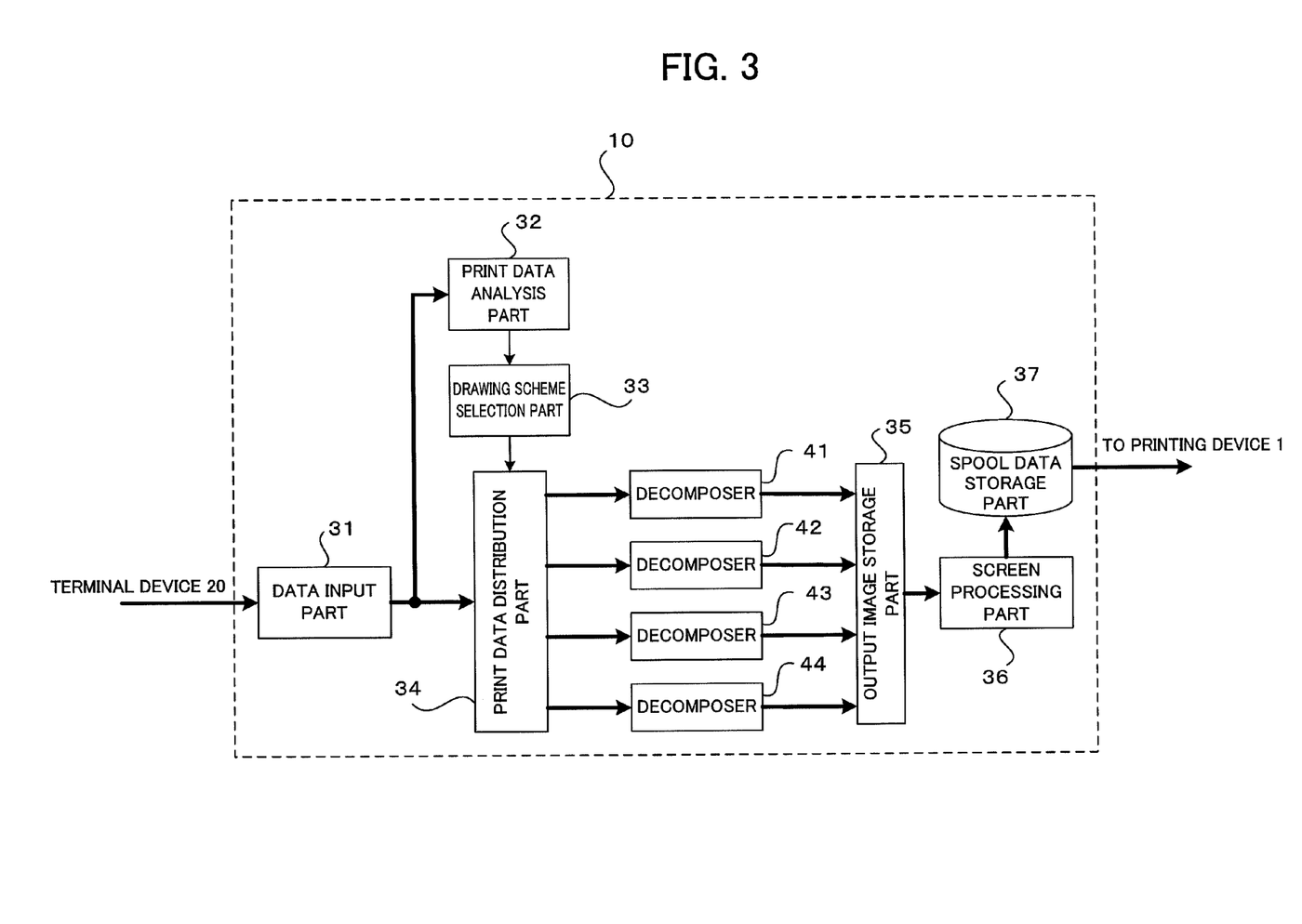
FIG. 3 is a block diagram showing the functional configuration of a controller 10 in the printing apparatus according to the first exemplary embodiment of the present invention.

FIG. 3 is a block diagram showing the functional configuration of the controller 10 realized by execution of the above-described print control program.

As shown in FIG. 3, the controller 10 has a data input part 31, a print data analysis part 32, a drawing scheme selection part 33, a print data distribution part 34, decomposers (drawing processing units) 41 to 43, an output image storage part 35, a screen processing part 36, and a spool data storage part 37.

The data input part 31 receives print data (print information) in the format of PDL (Page Description Language) or the like inputted from the terminal device 20 as a client device.

The print data analysis part 32 analyzes data contents of the print data received by the data input part 31.

More particularly, the print data analysis part 32 checks a color factor indicating whether an image based on the print data is a color image or a monochrome image, a vector data factor, the existence/absence of shade pattern, and analyzes a necessary processing amount upon decompose processing. Further, the print data analysis part 32 analyzes whether an instruction of ROP (Raster Operation Processing) as image combining processing among print basic colors is included in the print data, and analyzes the processing amount for rasterization processing for each page of the print data.

Note that in the present exemplary embodiment, as the print basic colors, Y (yellow), M (magenta), C (cyan) and K (black) are used; however, the print basic colors are not limited to those colors. The print basic colors may be any colors such as Y (yellow), M (magenta), C (cyan), K (black), Or (orange) and Gr (green) as long as they are plural colors.

The ROP processing is performed when print information includes an instruction of image combining processing among print basic colors. This processing is logical operation processing which is performed when two or more raster images are superposed. By execution of the ROP processing, effects such as "watermark" and "inversion" can be provided in addition to simple overwriting with hierarchical relation.

Further, the print data analysis part 32 calculates percentages of data amounts of the respective colors in each page of print data, and analyzes the difference in data amount among the respective colors (degree of bias). Further, the print data analysis part 32 analyzes a difference in processing amount of rasterization processing among e.g. four pages.

The drawing scheme selection part 33 selects whether print data drawing processing is performed by the decomposers 41 to 44 in parallel by page (by a predetermined unit of information amount) or in parallel by each of plural print basic colors such as YMCK colors, based on the result of analysis by the print data analysis part 32. The details of particular information, used by the drawing scheme selection part 33 upon selection of parallel processing scheme for rasterization processing, will be described later.

Note that in the present exemplary embodiment, as the print data parallel processing scheme, a page-based parallel processing scheme is used; however, the present invention is not limited to this scheme. That is, when print data is divided by a predetermined unit amount other than page and print data parallel processing is performed by this predetermined unit amount, the present invention is also applicable.

The print data distribution part 34 distributes the print data received by the data input part 31 to the four decomposers 41 to 44 based on the result of selection by the drawing scheme selection part 33.

Note that in the present exemplary embodiment, the print data distribution part 34 distributes the print data to the four decomposers 41 to 44 based on the result of selection by the drawing scheme selection part 33. However, it may be arranged such that all the print data is transmitted to the respective decomposers 41 to 44, and based on the result of selection by the drawing scheme selection part 33, instructions of the contents of actual processing are provided to the respective decomposers 41 to 44.

The decomposers 41 to 44, respectively having a function of independently performing print data drawing processing, perform RIP (Raster Image Processing) to map the print data in the format of PDL or the like, distributed by the print data distribution part 34, into rasterized data such as bitmap data. Note that the RIP processing includes input/output data conversion processing, calibration processing, total toner amount regulation processing and the like.

Note that in the present exemplary embodiment, for the purpose of simplification of explanation, the print data drawing processing is performed by the four decomposers 41 to 44. However, the present invention is not limited to this number of decomposers, and is also applicable to a case where the print data drawing processing is performed by five or more decomposers.

The output image storage part 35 holds print data converted by the decomposers 41 to 44. The screen processing part 36 converts respective YMCK color multi-value image data stored in the output image storage part 35 into YMCK binary image data by binarization processing, and stores the converted data into the spool data storage part 37.

The spool data storage part 37 is a storage unit to spool print image data to be transmitted to the printing device 1 until necessary timing. The print image data stored in the spool data storage part 37 is sequentially transmitted to the printing device 1.

Next, the operation of the controller 10 in the printing apparatus according to the present exemplary embodiment will be described in detail with reference to the drawings.

First, the page-based parallel processing and the color-based parallel processing will be described with reference to FIGS. 4 and 5.

Figure 4:
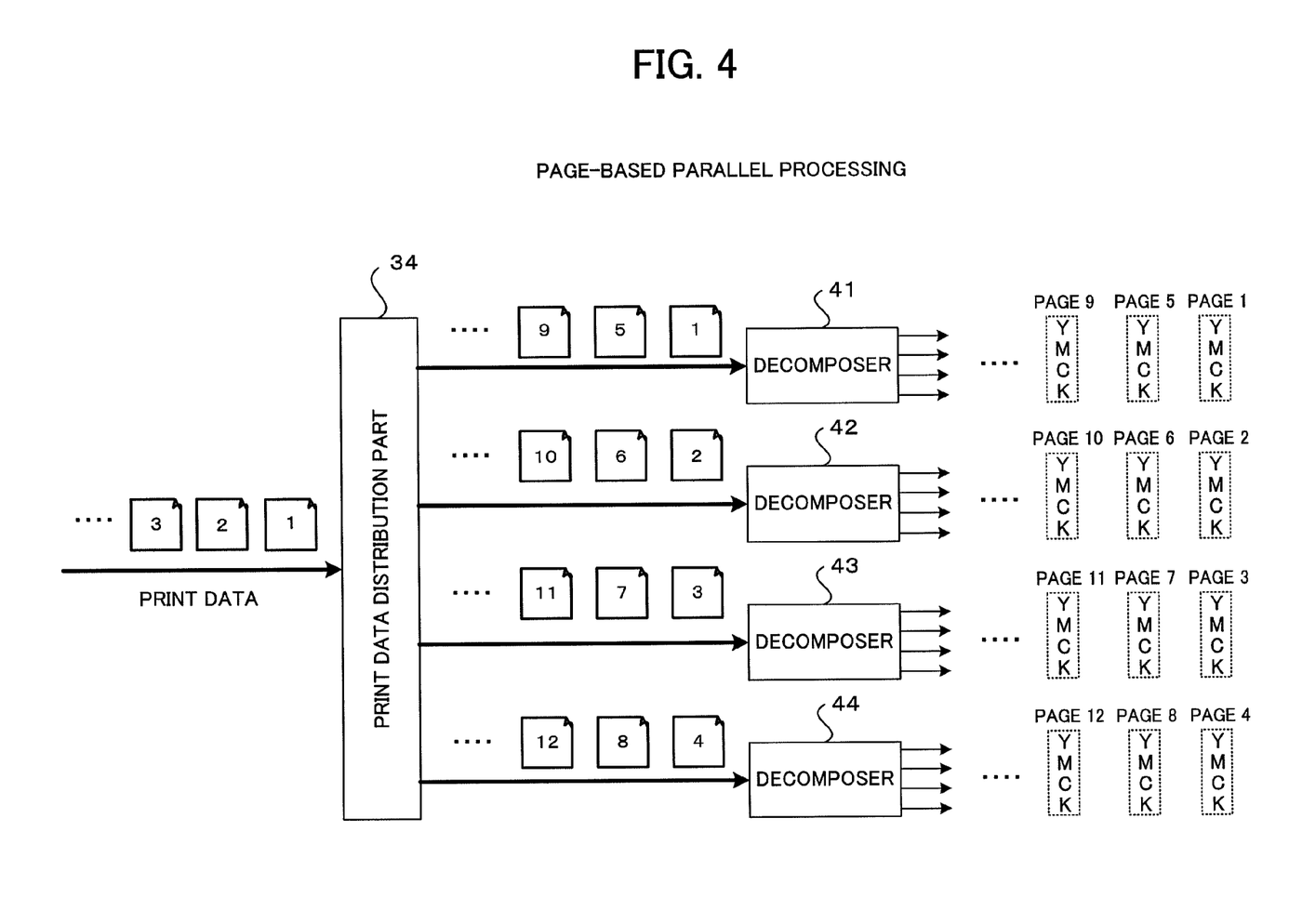
FIG. 4 is an explanatory view showing page-based parallel processing in the printing apparatus according to the first exemplary embodiment of the present invention.

When the page-based parallel processing has been selected by the drawing scheme selection part 33, the print data distribution part 34 distributes print data to the respective decomposers 41 to 44 by page, as shown in FIG. 4. More particularly, the print data distribution part 34 distributes the print data for the first page to the decomposer 41; the print data for the second page to the decomposer 42; the print data for the third page to the decomposer 43; and the print data for the fourth page to the decomposer 44.

Then the decomposers 41 to 44 respectively convert the page-based print data into image data for the respective YMCK colors and output the converted image data.

Figure 5:
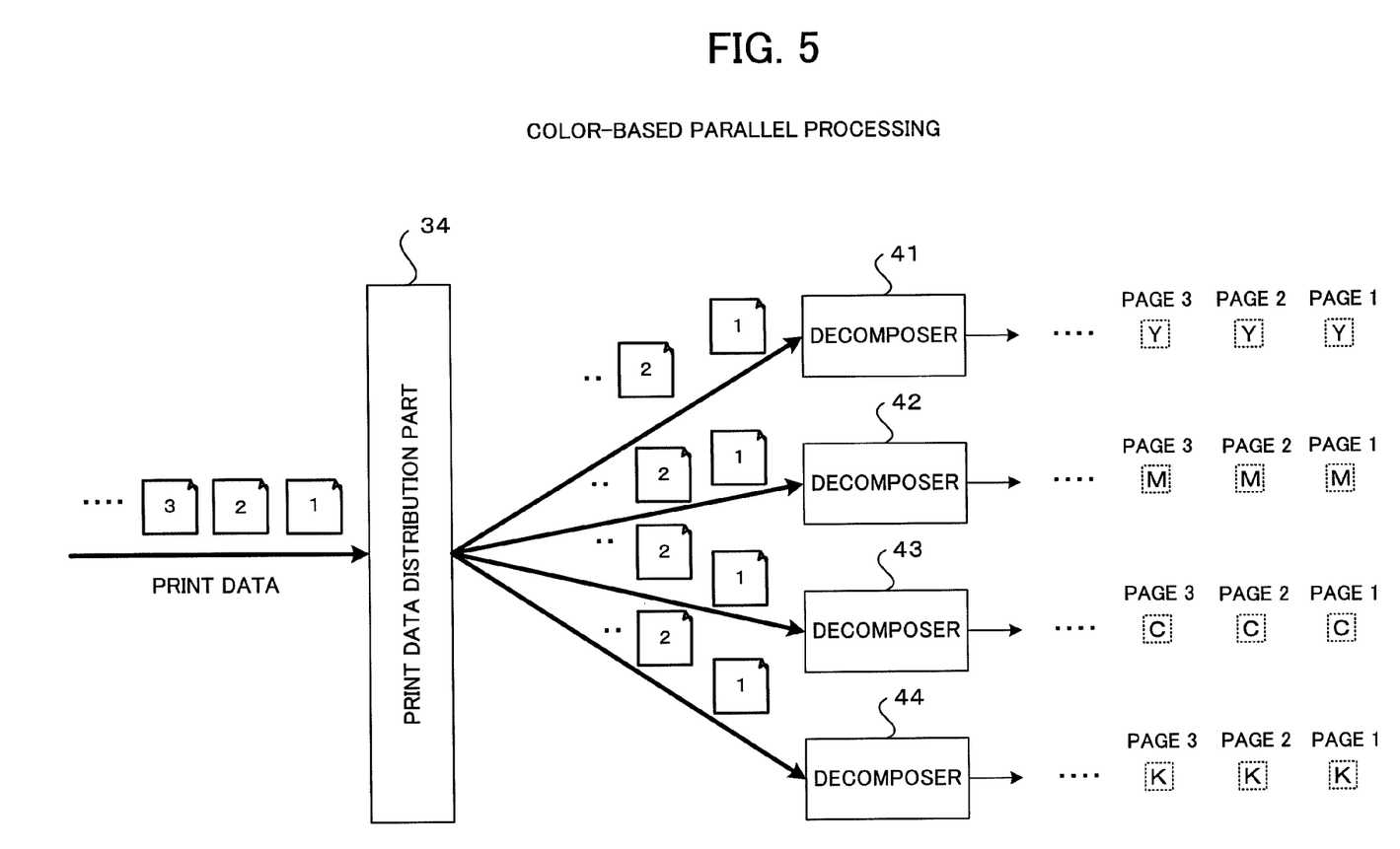
FIG. 5 is an explanatory view showing color-based parallel processing in the printing apparatus according to the first exemplary embodiment of the present invention.

When the color-based parallel processing has been selected by the drawing scheme selection part 33, the print data distribution part 34 distributes the print data for one page sharingly to the respective decomposers 41 to 44, as shown in FIG. 5. More particularly, the print data distribution part 34 distributes the print data for the first page to the decomposers 41 to 44; and distributes the print data for the second page to the decomposers 41 to 44.

Then, the decomposers 41 to 44 respectively rasterize the distributed print data into image data corresponding to respective print basic colors. In this case, the decomposers 41 to 44, respectively in charge of Y (yellow), M (magenta), C (cyan), and K (black) colors, perform rasterization processing.

Figure 6:
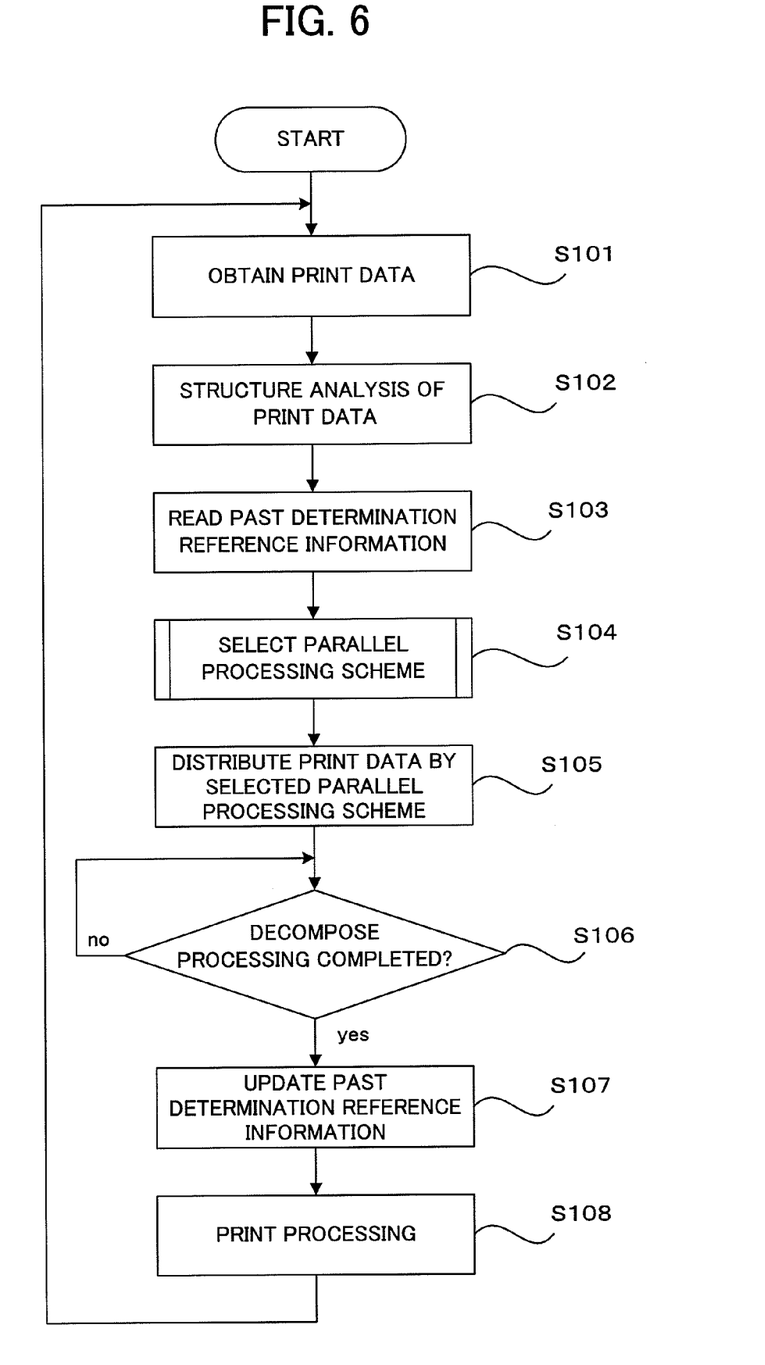
FIG. 6 is a flowchart showing an operation of the printing apparatus according to the first exemplary embodiment of the present invention.

Next, the operation of the printing apparatus according to the present exemplary embodiment will be described with reference to the flowchart of FIG. 6.

When print data from the terminal device 20 has been received by the data input part 31 (step S101), the print data analysis part 32 analyzes the contents of the print data (step S102).

Then the drawing scheme selection part 33 reads past determination reference information (step S103), and selects whether rasterization processing on the print data is to be performed in parallel by page or in parallel by print basic color (step S104), based on the result of analysis by the print data analysis part 32 and the read past determination reference information.

Note that the past determination reference information means record information of other print data processed in the past. The drawing scheme selection part 33 reads the past determination reference information and refers to the past processing result of the other print data having similar structure, thereby determines whether high-speed processing can be realized by the parallel processing by page or the parallel processing by color.

Then the print data distribution part 34 distributes the print data received by the data input part 31 to the decomposers 41 to 44 based on the parallel processing scheme selected by the drawing scheme selection part 33 (step S105).

Then, when the decompose processing has been performed on the print data by the decomposers 41 to 44 (step S106), the past determination reference information is updated in accordance with the result of processing (step S107). Then the image data decomposed by the decomposers 41 to 44 is stored in the output image storage part 35, then subjected to screen processing by the screen processing part 36, and stored into the spool data storage part 37. The image data stored in the spool data storage part 37 is transmitted to the printing device 1 and print processing is performed (step S108).

Next, an example of a particular method of the selection of parallel processing scheme shown in the flowchart of FIG. 6 will be described with reference to the flowchart of FIG. 7.

For example, the drawing scheme selection part 33 determines whether print data indicates a color image or a monochrome image (step S201). When it is determined that the print data indicates a monochrome image (No at step S201), the drawing scheme selection part 33 selects the page-based parallel processing scheme (step S204).

Further, when it is determined at step S201 that the print data indicates a color image (Yes at step S201), the drawing scheme selection part 33 further determines whether or not the print data includes an instruction of ROP processing (step S202). When the print data includes an instruction of ROP processing (Yes at step S202), the drawing scheme selection part 33 selects the page-based parallel processing scheme (step S204).

Further, when it is determined at step S202 that the print data does not include an instruction of ROP processing (No at step S202), the drawing scheme selection part 33 selects the color-based parallel processing scheme (step S203).

Next, another example of the particular method of the selection of parallel processing scheme shown in the flowchart of FIG. 6 will be described with reference to the flowchart of FIG. 8.

For example, the drawing scheme selection part 33 determines whether or not the processing amount for rasterization processing for some page in the print data is equal to or greater than a predetermined threshold value (step S301). When it is determined that the processing amount is equal to or greater than the threshold value (Yes at step S301), the drawing scheme selection part 33 selects the color-based parallel processing scheme (step S302). Further, when it is determined at step S301 that the processing amount is less than the threshold value (No at step S301), the drawing scheme selection part 33 selects the page-based parallel processing (step S303).

As the processing amount, processing time necessary for execution of rasterization processing of the page may be used. As an example, when the processing time is longer than 50 ms, it may be determined that the processing amount is equal to or greater than the threshold value.

Next, another example of the particular method of the selection of parallel processing scheme shown in the flowchart of FIG. 6 will be described with reference to the flowchart of FIG. 9.

For example, the drawing scheme selection part 33 calculates percentages of the respective print basic colors in a page of the print data (step S401). When the percentage of a single color is equal to or higher than 75%, the drawing scheme selection part 33 selects the page-based parallel processing scheme (step S403).

Further, even in a case where the percentage of a single color is not equal to or higher than 75%, when the difference in percentage among the respective colors is large, for example, when the largest difference in percentage among the respective colors is equal to or higher than 50% (Yes at step S404), the drawing scheme selection part 33 selects the page-based parallel processing scheme (step S403).

Further, in a case where the difference in percentage among the respective colors is small, when the percentage of a single color is not equal to or higher than 75% (No at step S402) and the largest difference in percentage among the respective colors is lower than 50% (No at step S404), the drawing scheme selection part 33 selects the color-based parallel processing scheme (step S405).

Figure 10A:
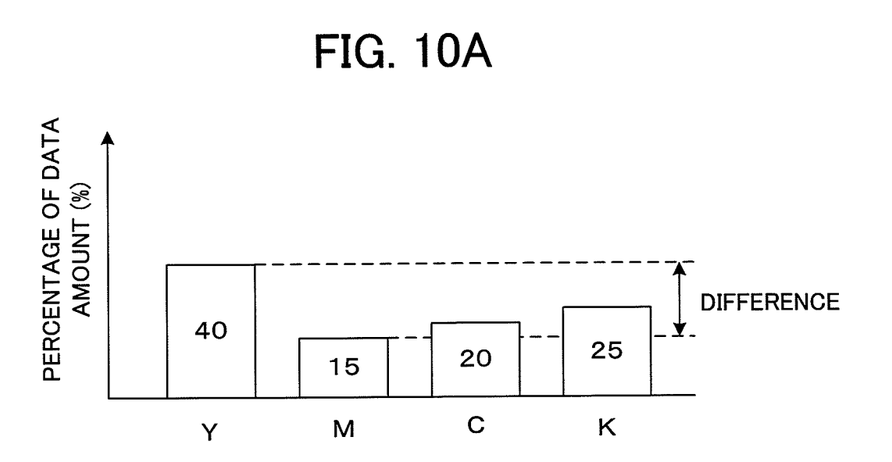
FIGS. 10A and 10B are graphs showing particular examples of the selection of parallel processing scheme based on a difference among respective colors in a page.
Figure 10B:
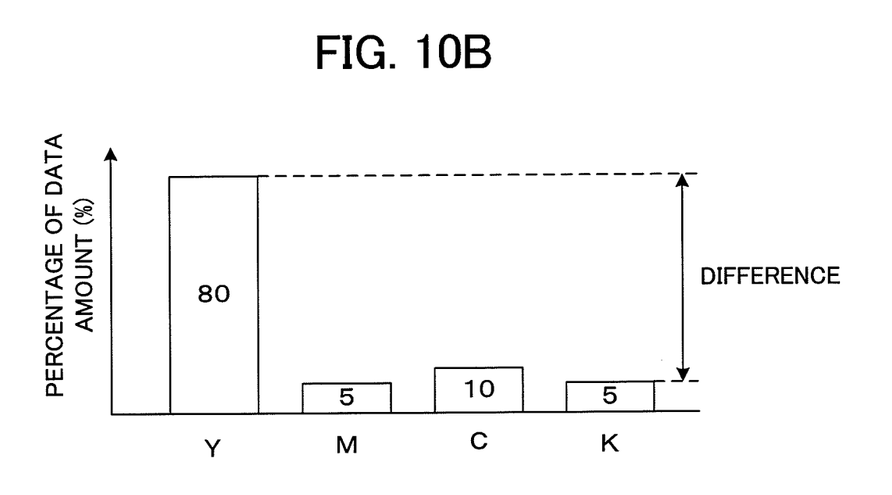

FIGS. 10A and 10B show particular examples of the selection of parallel processing scheme based on the difference among the respective colors in a page. In a case where the percentages of the YMCK print basic colors in one page are as shown in FIG. 10A, the percentage of any single color is not higher than 75%, and the difference between the maximum percentage of the Y color and the minimum percentage of the M color is not higher than 50%. Accordingly, in the case as shown in FIG. 10A, the drawing scheme selection part 33 selects the color-based parallel processing scheme.

Further, in a case where the percentages of the YMCK print basic colors in one page are as shown in FIG. 10B, the percentage of the Y color is higher than 75% and the difference between the maximum percentage of the Y color and the minimum percentages of the K and M colors is higher than 50%. Accordingly, in the case as shown in FIG. 10B, the drawing scheme selection part 33 selects the page-based parallel processing scheme.

Figure 7:
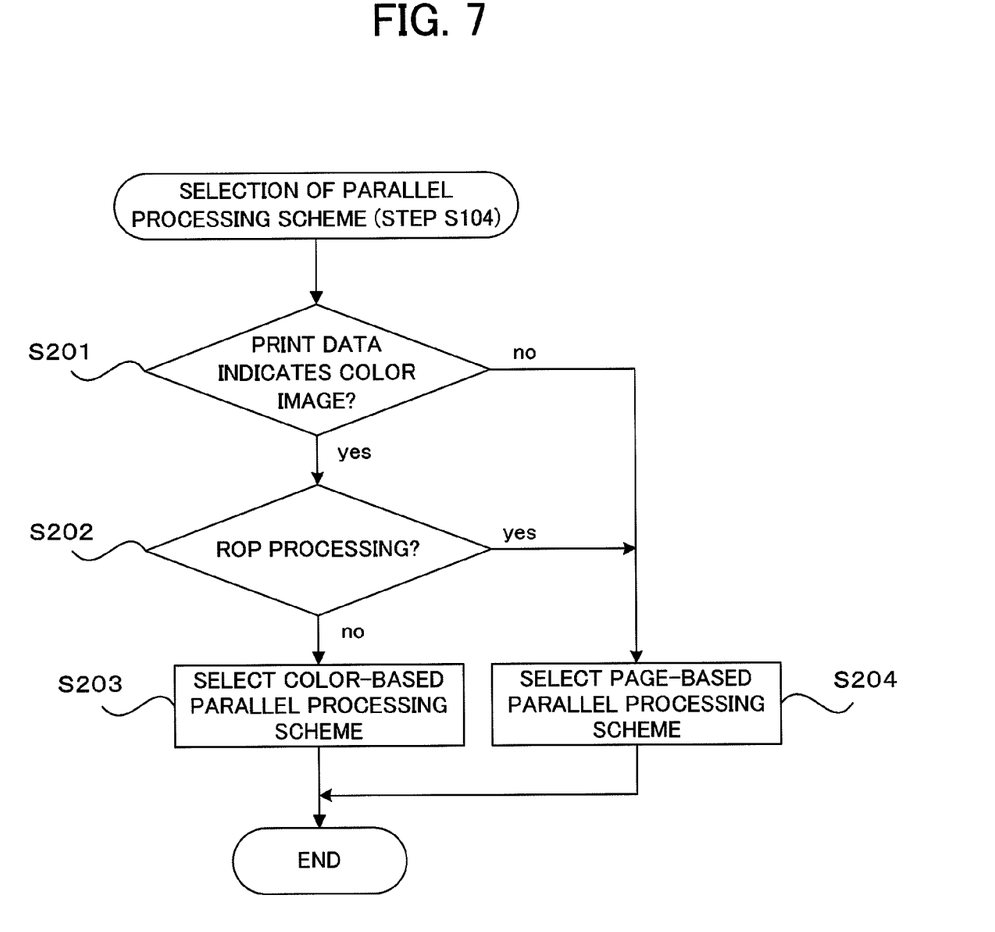
FIG. 7 is a flowchart showing an example of a particular method of selection of parallel processing scheme (step S104) shown in the flowchart of FIG. 6.
Figure 8:
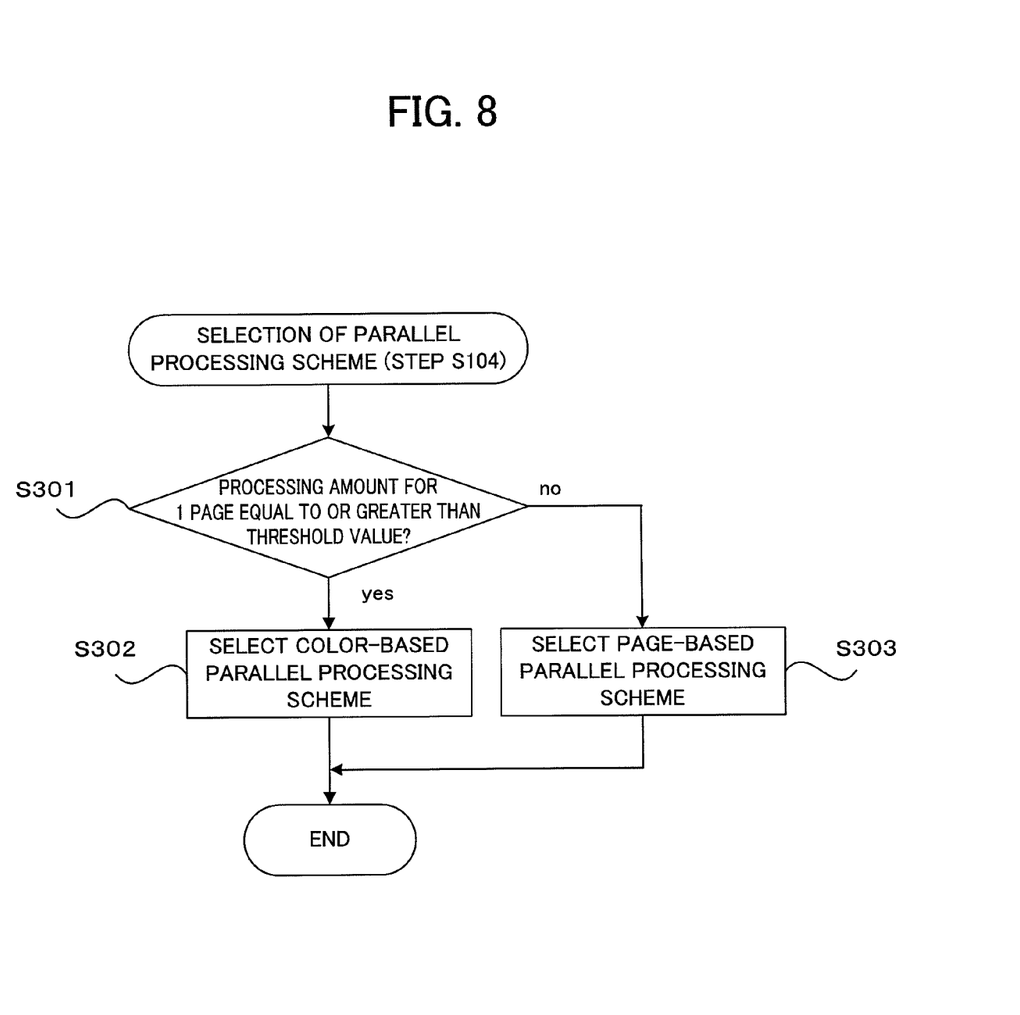
FIG. 8 is a flowchart showing another example of the particular method of the selection of parallel processing scheme (step S104) shown in the flowchart of FIG. 6.
Figure 9:
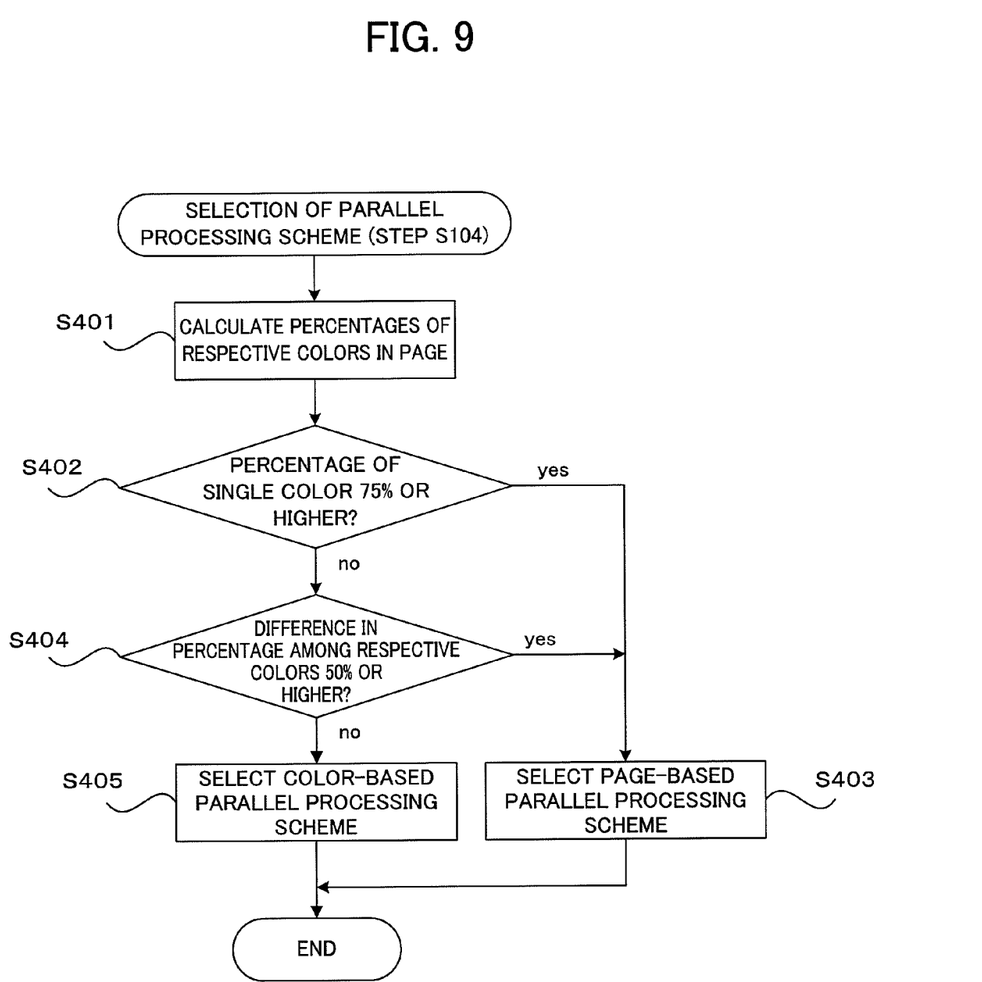
FIG. 9 is a flowchart showing another example of the particular method of the selection of parallel processing scheme (step S104) shown in the flowchart of FIG. 6.

Note that in the above description, the methods of the selection of parallel processing scheme as shown in FIGS. 7 to 9 are independently described; however, it may be arranged such that these parallel processing schemes are combined and used as a parallel processing scheme in rasterization processing.

[Second Exemplary Embodiment]

Next, the printing apparatus according to a second exemplary embodiment of the present invention will be described.

In the printing apparatus according to the present exemplary embodiment, the only difference from the printing apparatus according to the above-described first exemplary embodiment is the method of selection by the drawing scheme selection part 33. Accordingly, the printing apparatus according to the present exemplary embodiment will be described using the configuration of the first exemplary embodiment shown in FIGS. 1 to 3.

Figure 11:
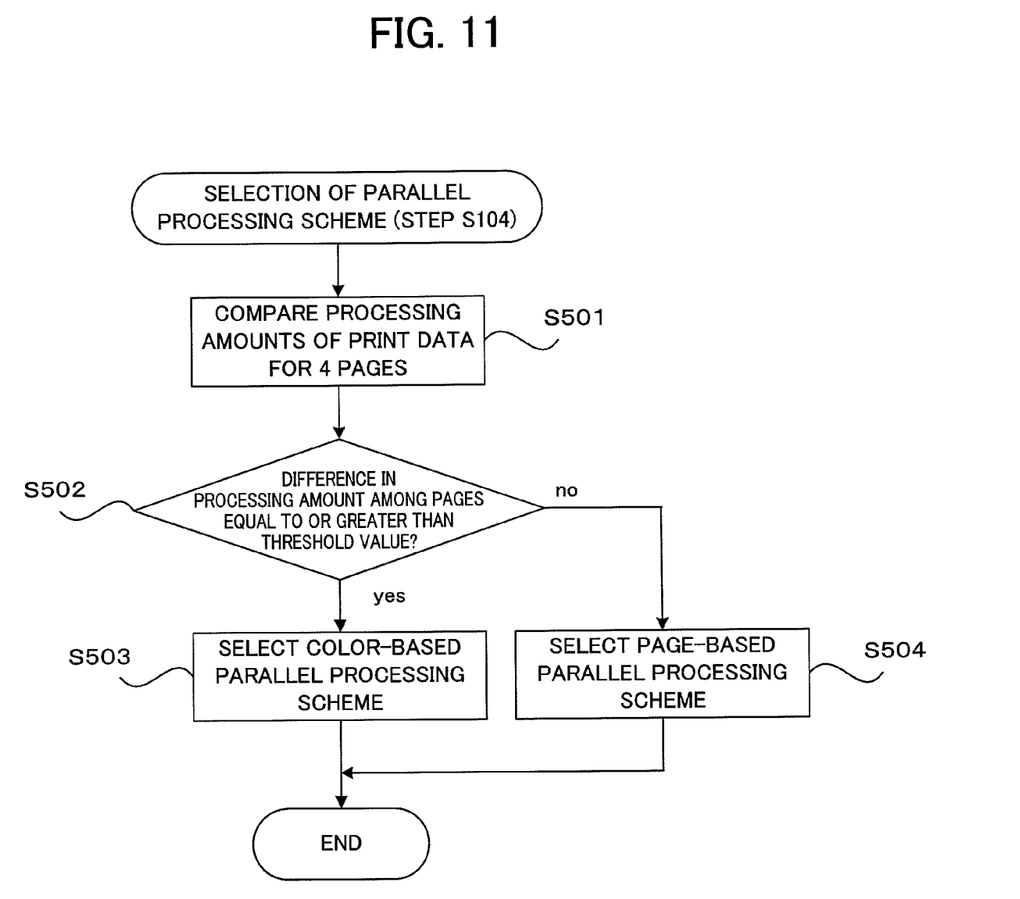
FIG. 11 is a flowchart showing the method of the selection of parallel processing scheme in the printing apparatus according to a second exemplary embodiment of the present invention.

The method of the selection of parallel processing scheme in the printing apparatus according to the present exemplary embodiment will be described with reference the flowchart of FIG. 11.

The drawing scheme selection part 33 according to the present exemplary embodiment does not select a parallel processing scheme in rasterization processing based on print data by one page, but selects a parallel processing scheme in rasterization processing based on print data for plural pages. Note that in the present exemplary embodiment, for the sake of simplification of explanation, the selection of parallel processing scheme in rasterization processing is performed by 4 pages corresponding to the number of decomposers 41 to 44.

The drawing scheme selection part 33 according to the present exemplary embodiment compares processing amounts for print data for four pages (step S501), and determines whether or not the difference in processing amount among the pages (degree of bias) is equal to or greater than a predetermined threshold value (step S502). Then, when the difference in processing amount among the pages is less than the threshold value (No at step S502), the drawing scheme selection part 33 selects the page-based parallel processing (step S504).

Further, when it is determined at step S502 that the difference in processing amount among the pages is equal to or greater than the threshold value, the drawing scheme selection part 33 selects the color-based parallel processing scheme (step S503).

Figure 12A:
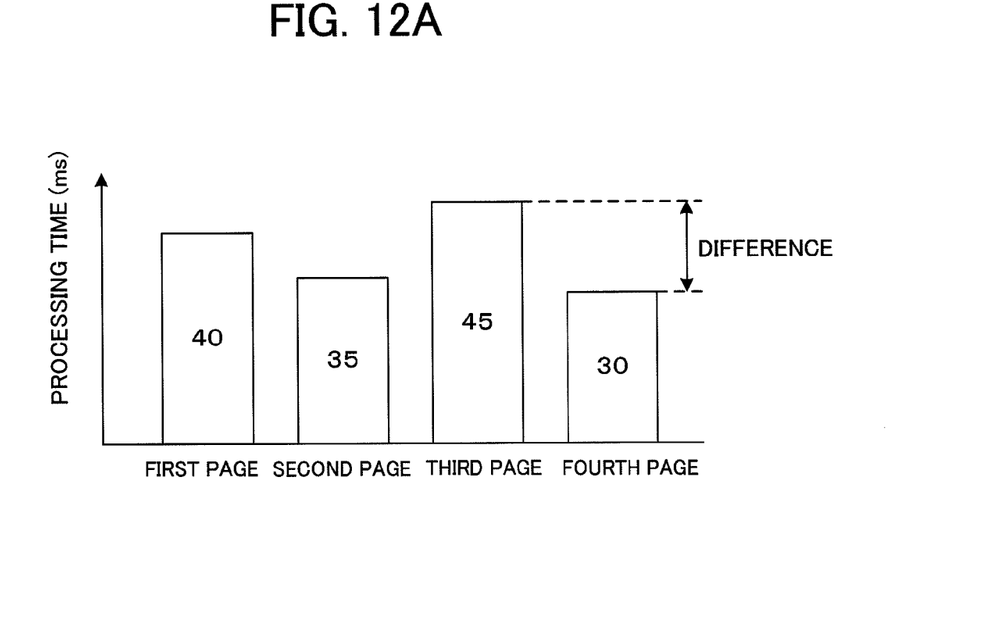
FIGS. 12A and 12B are graphs showing particular examples of the selection of parallel processing scheme based on a difference in print data for four pages.
Figure 12B:
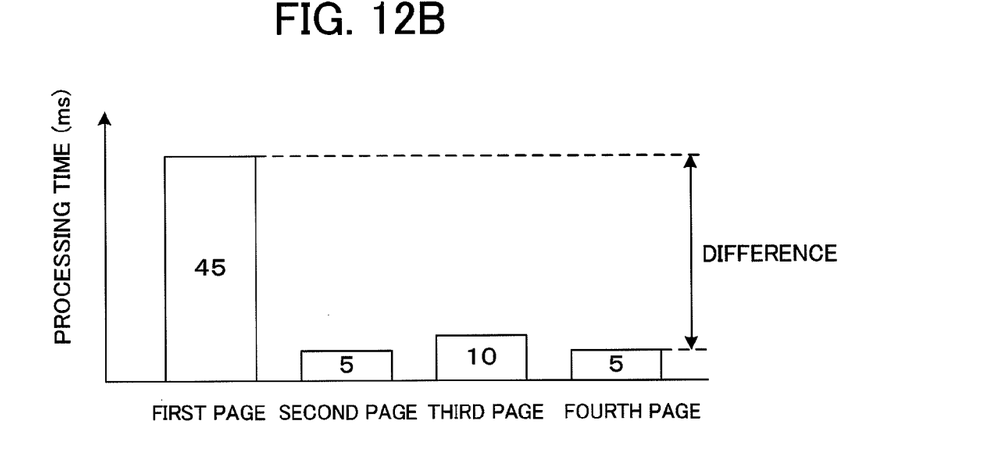

FIGS. 12A and 12B show particular examples of the selection of parallel processing scheme based on the difference in print data for four pages. In these figures, processing time necessary for execution of rasterization processing of a page is represented as a processing amount of the page. For example, when the difference in processing time is over 30 ms, it is determined that the difference among the pages exceeds the threshold value.

In a case where the processing times for print data for some four pages are as shown in FIG. 12A, the difference between the third page with the longest processing time and the fourth page with the shortest processing time is 15 ms which is not longer than 30 ms. Accordingly, in the case as shown in FIG. 12A, the drawing scheme selection part 33 selects the page-based parallel processing scheme.

Further, in a case where the processing times for print data for some four pages are as shown in FIG. 12B, the difference between the first page with the longest processing time and the second and fourth pages with the shortest processing time is 40 ms which is longer than 30 ms. Accordingly, in the case as shown in FIG. 12B, the drawing scheme selection part 33 selects the color-based parallel processing scheme.

[Third Exemplary Embodiment]

Next, the printing apparatus according to a third exemplary embodiment of the present invention will be described.

In the printing apparatus according to the present exemplary embodiment, the only difference from the printing apparatus according to the above-described first exemplary embodiment is the method of selection by the drawing scheme selection part 33. Accordingly, the printing apparatus according to the present exemplary embodiment will be described using the configuration of the first exemplary embodiment shown in FIGS. 1 to 3.

Figure 13:
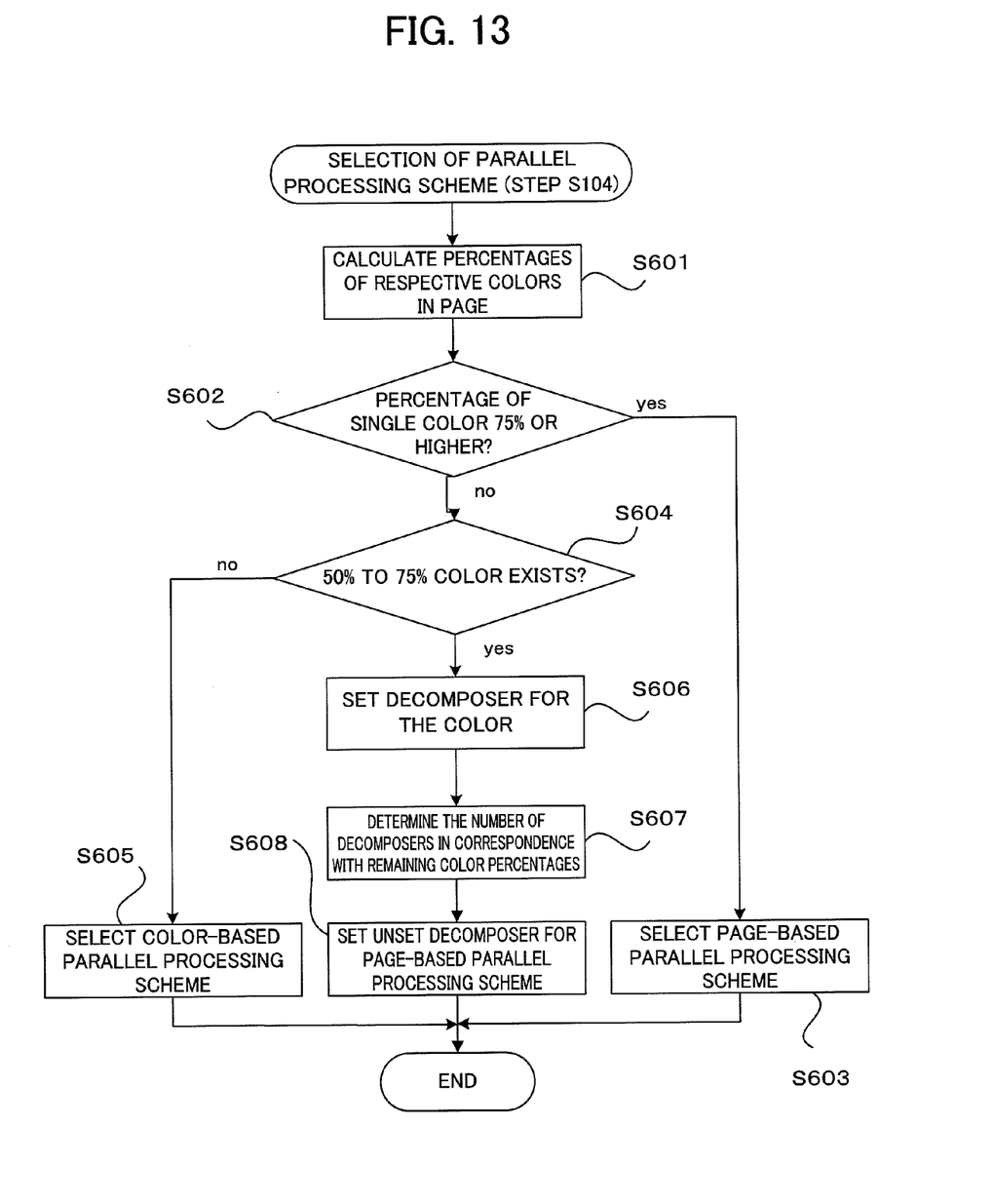
FIG. 13 is a flowchart showing the method of the selection of parallel processing scheme in the printing apparatus according to a third exemplary embodiment of the present invention.

The method of the selection of parallel processing scheme in the printing apparatus according to the present exemplary embodiment will be described with reference to the flowchart of FIG. 13.

The drawing scheme selection part 33 in the present exemplary embodiment does not alternatively select one of the page-based parallel processing and the color-based parallel processing, but selects print basic color-based parallel processing as a parallel processing scheme for some of plural decomposers, and as a parallel processing scheme for the other plural decomposers, selects the page-based parallel processing. That is, the printing apparatus according to the present exemplary embodiment performs the page-based parallel processing and the color-based parallel processing for the plural decomposers.

The drawing scheme selection part 33 in the present exemplary embodiment calculates the percentages of the respective colors in a page of print data (step S601), and when the percentage of a single color is equal to or higher than 75%, selects the page-based parallel processing scheme (step S603).

Further, when it is determined at step S602 that the percentage of a single color is not equal to or higher than 75%, the drawing scheme selection part 33 determines whether or not there is a color of which the percentage is 50% to 75% exists (step S604).

When it is determined at step S604 that there is no single color of which the percentage is 50% to 75%, it is determined that the difference among the respective colors is small. The drawing scheme selection part 33 selects the color-based parallel processing scheme (step S605).

Then, when it is determined at step S604 that a single color the percentage of which is 50% to 75% exists, the drawing scheme selection part 33 sets a decomposer as a specialized decomposer for the color (step S606). In this example, a specialized decomposer is set for the K color. Then the drawing scheme selection part 33 determines the number of decomposers to be allotted to the remaining YMC colors in correspondence with the percentages of the remaining colors.

For example, when the percentages of the YMC colors other than the K color are within the range of 25% to 35%, the number of decomposers to be allotted is one. When the percentages of the YMC colors other than the K color are within the range 30% to 50%, the number of decomposers to be allotted is two.

Finally, the drawing scheme selection part 33 selects the page-based parallel processing scheme for an unset decomposer (step S608).

That is, the drawing scheme selection part 33 according to the present exemplary embodiment selects one of the page-based parallel processing scheme, the print basic color-based parallel processing, and the scheme of page-based parallel processing and print basic color-based parallel processing, in correspondence with the result of analysis by the print data analysis part 32.

Figure 14:
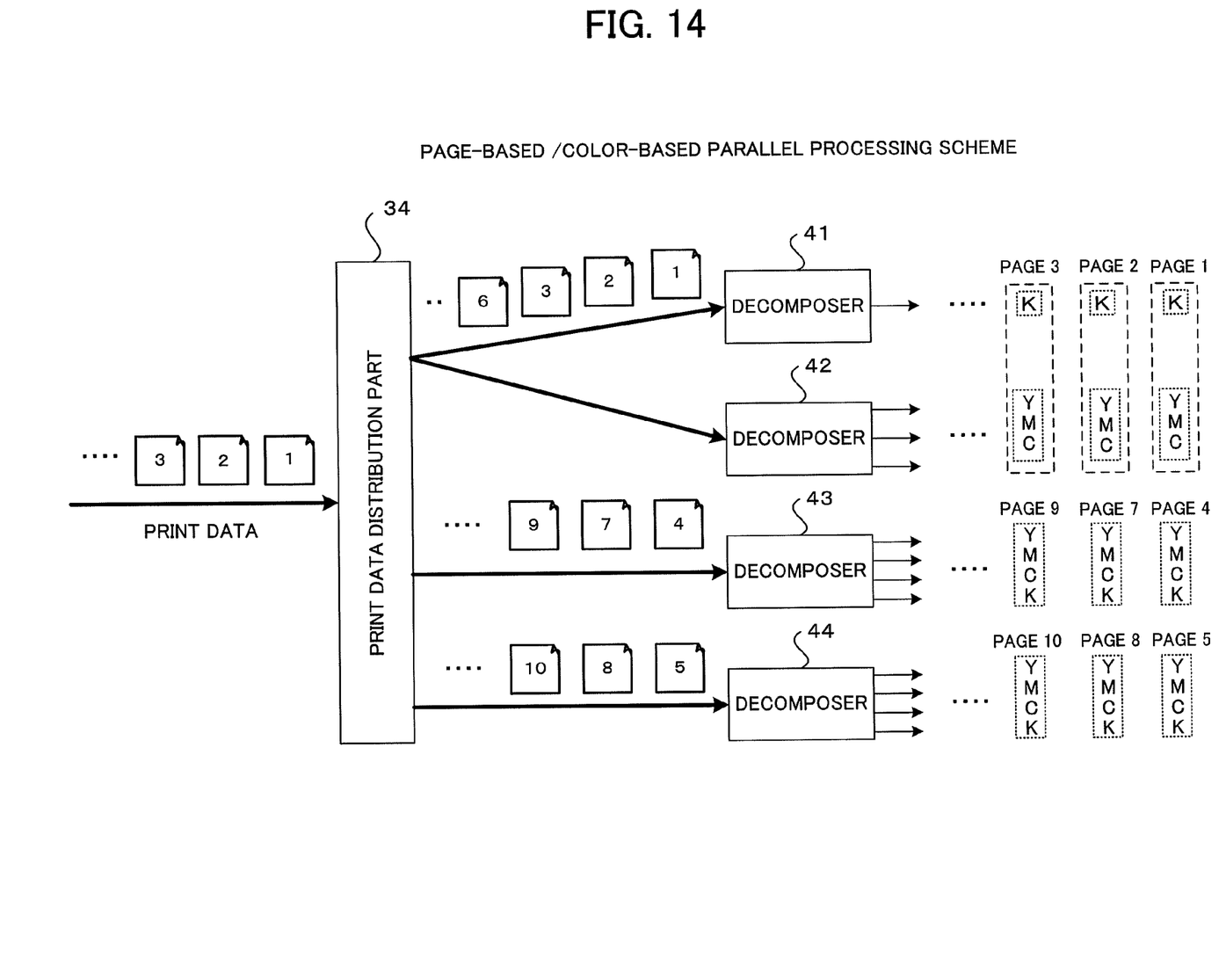
FIG. 14 is an explanatory view showing a page-based and color-based parallel processing scheme.

FIG. 14 shows a particular example of a case where the scheme of page-based parallel processing and color-based parallel processing has been selected. In FIG. 14, the color-based parallel processing is allotted to the decomposers 41 and 42, and the page-based parallel processing is allotted to the decomposers 43 and 44. In the decomposer 41, the K color is set, and in the decomposer 42, the YMC colors are set.

[Modification]

In the above-described exemplary embodiments, the present invention is applied to the printing apparatus which performs printing on continuous-form paper. However, the present invention is not limited to this apparatus, and is also applicable to a printing apparatus which performs printing on a cut sheet.

Further, in the above-described exemplary embodiments, print-data decompose processing is performed in parallel by the four decomposers. The plural decomposers may be realized with plural independent hardware units, or may be realized with software parallel processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
a plurality of drawing processing units capable of performing drawing processing on print data having a plurality of print basic colors;
a determining unit that determines whether the processing amount for rasterization processing for some page in the print data is equal to or greater than a threshold value; and
a selection unit that selects the drawing processing on the print data by the drawing processing units in parallel by page or the drawing processing on the print data by the drawing processing units in parallel by each of the plurality of print basic colors,
wherein when the processing amount is equal to or greater than the threshold value, the selection units selects the drawing processing on the print data by the drawing processing units in parallel by each of the plurality of print basic colors,
when the processing amount is less than the threshold value, the selection units select s the drawing processing on the print data by the drawing processing units in parallel by page, and
the rasterization processing is the processing which maps the print data in a PDL format into bitmap data.

2. A print control apparatus comprising:
a plurality of drawing processing units capable of performing drawing processing on print data having a plurality of print basic colors;
a determining unit that determines whether a percentage of a single color is equal to or greater than a first threshold value, and whether a largest difference in percentage among the respective colors is equal to or greater than a second threshold value; and
a selection unit that selects the drawing processing on the print data by the drawing processing units in parallel by page, when the percentage of a single color is equal to or greater than the first threshold value, or when the largest difference in percentage among the respective colors is equal to or greater than the second threshold value, and selects the drawing processing on the print data by the drawing processing units in parallel by each of the plurality of print basic colors, when the percentage of a single color is less than the first threshold value, and when the largest difference in percentage among the respective colors is less than the second threshold value.

3. A print control apparatus comprising:
a plurality of drawing processing units capable of performing drawing processing on print data having a plurality of print basic colors;
a determining unit that determines whether a difference between a page with a longest processing time and another page with a shortest processing time among a predetermined number of pages is equal to or greater than a threshold value; and
a selection unit that selects the drawing processing on the print data by the drawing processing units in parallel by page or the drawing processing on the print data by the drawing processing units in parallel by each of the plurality of print basic colors,
wherein when the difference is equal to or greater than the threshold value, the selection unit selects the drawing processing on the print data by the drawing processing units in parallel by each of the plurality of print basic colors, and
when the difference is less than the threshold value, the selection unit selects the drawing processing on the print data by the drawing processing units in parallel by page.

4. A print control apparatus comprising:
a plurality of drawing processing units capable of performing drawing processing on print data having a plurality of print basic colors;
a determining unit that determines whether or not the processing time for rasterization processing for a page in the print data is equal to or longer than a threshold value; and
a selection unit that selects the drawing processing on the print data by the drawing processing units in parallel by page or the drawing processing on the print data by the drawing processing units in parallel by each of the plurality of print basic colors,
wherein when the processing time is equal to or longer than the threshold value, the selection units selects the drawing processing on the print data by the drawing processing units in parallel by each of the plurality of print basic colors,
wherein when the processing time is shorter than the threshold value, the selection units selects the drawing processing on the print data by the drawing processing units in parallel by page,
wherein the rasterization processing is processing which maps the print data in a PDL format into bitmap data.

* * * * *